Figure 2A:
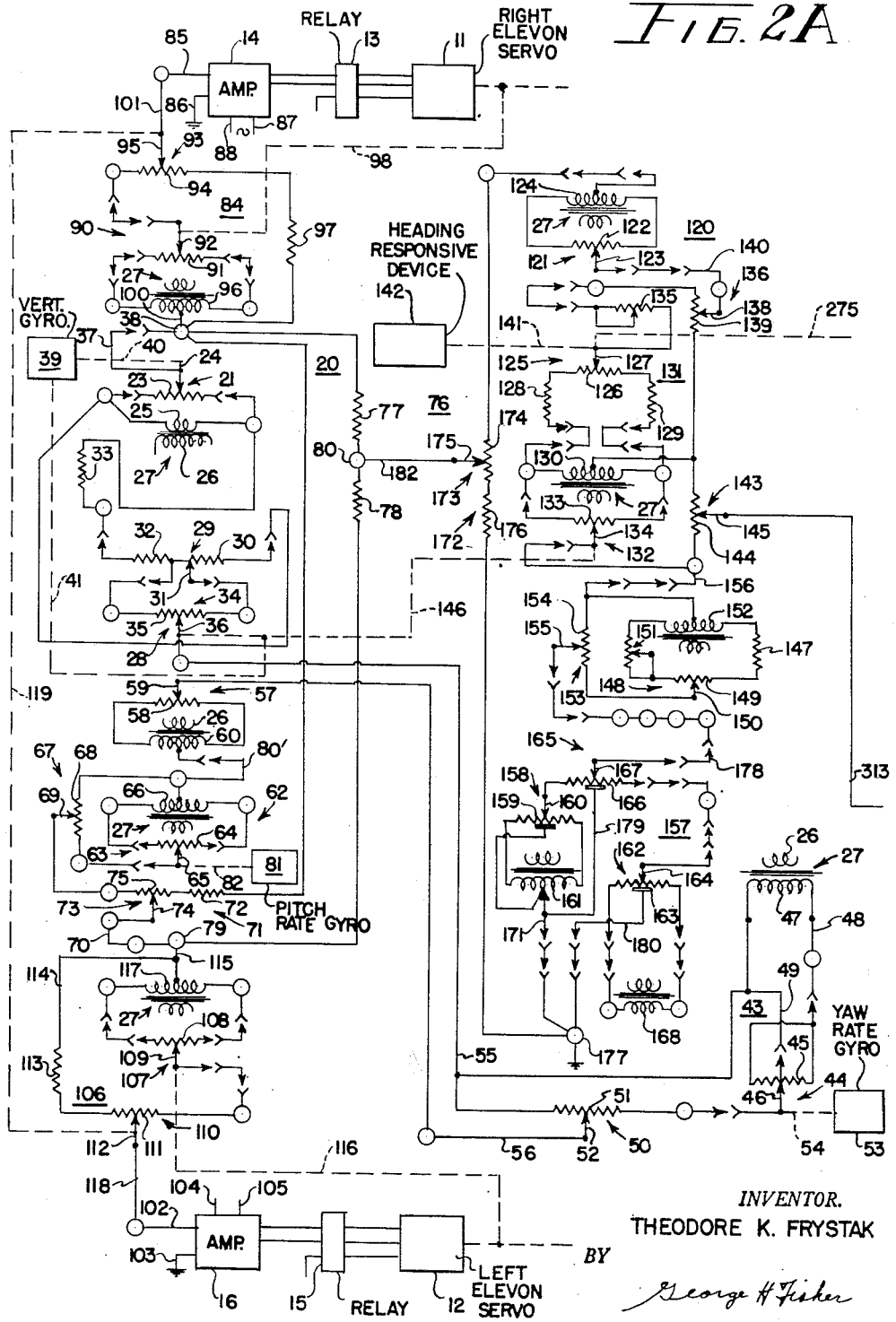

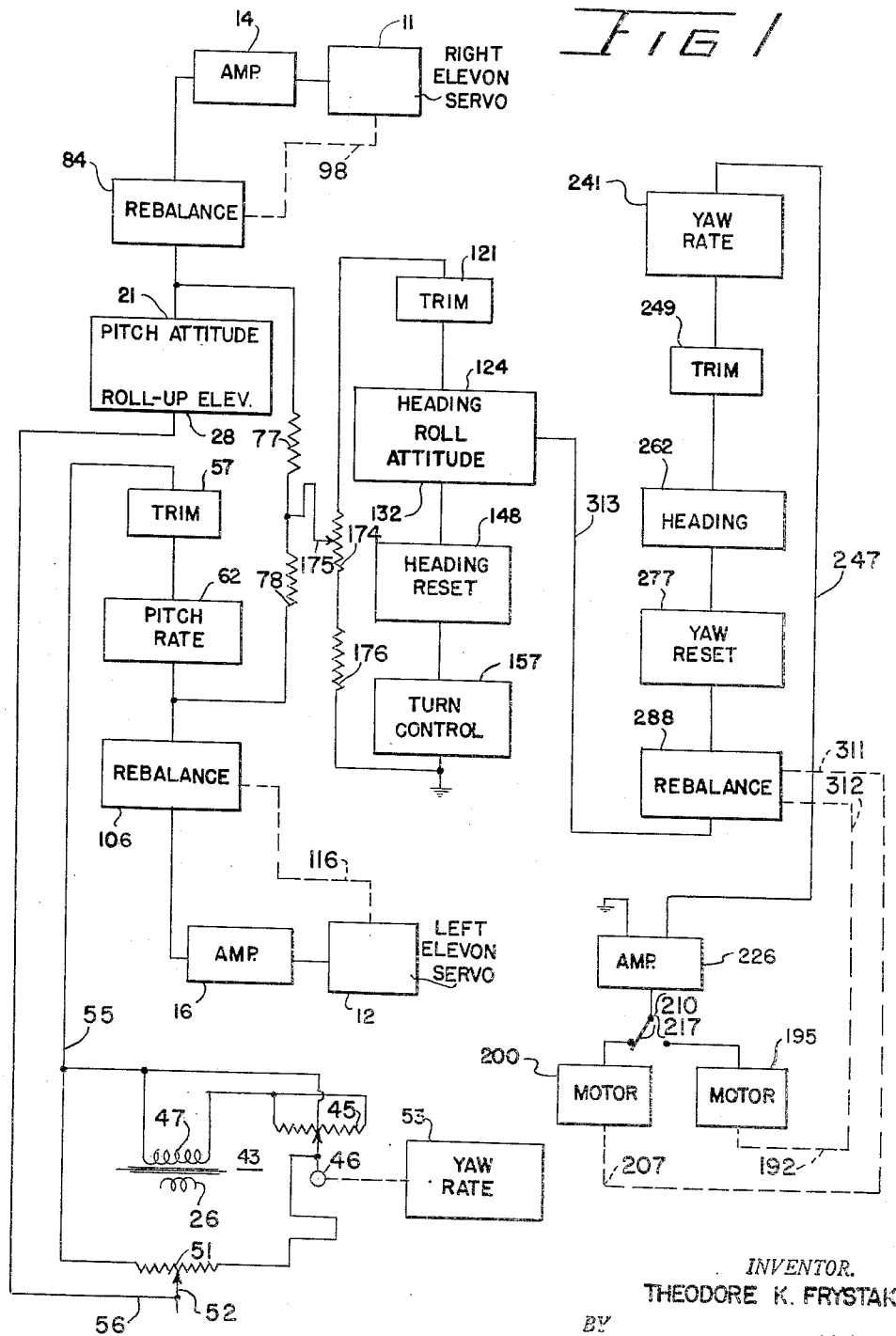

INVENTOR.
THEODORE K. FRYSTAK
BY
George H Fisher
ATTORNEY

INVENTOR.
THEODORE K. FRYSTAK
BY
George H Fisher
ATTORNEY

UNITED STATES PATENT OFFICE 2,655,328

STEERING MECHANISM

Theodore K. Frystak, St. Louis Park, Minn., assignor to Minneapolis-Honeywell Regulator Company, Minneapolis, Minn., a corporation of Delaware Application August 8, 1951, Serial No. 240,863

11 Claims. (Cl. 244—77)

This invention pertains to steering mechanisms for dirigible craft and particularly to steering mechanisms for an aircraft of the flying wing type.

An aircraft of this type is provided with a pair of elevon control surfaces with an elevon located in the trailing edge of the left and right wings of said craft. Both elevons are operable together in two ways; in one case they may be moved about their supporting axis in the same direction to act as elevators and in the other case may be rotated about their supporting axis in opposite directions to act as ailerons.

The craft also includes two rudder surfaces with a rudder arranged in each of the left and right wings at the trailing edge and adjacent the corresponding elevon. Each rudder consists of two hinged portions. These portions when a rudder is actuated rotate in opposite directions away from the trailing edge and out of the normal contour of the wing and are intended to merely increase the drag of the left or right wing.

The craft with its control surfaces may thus be similar to that adapted to be controlled by apparatus disclosed in a U. S. patent application of Robert J. Kutzler, Serial No. 212,345, filed February 27, 1951.

A flying wing aircraft as equipped with apparatus in the aforesaid application of Robert J. Kutzler tended to gain altitude when the craft was in a banked turn, due apparently to a nose up attitude assumed when placed in the banked turn. It was found that this nose up attitude resulted from operation of a rudder of the craft during initiation of such turn even though the rudder had two portions oppositely positioned when the rudder was operated and was intended merely to increase the drag or resistance of the wing supporting said rudder. This increase in altitude, it is believed, is occasioned by the greater effect of the upper portion of the rudder than the lower on the flight attitude of the aircraft. This tendency to gain altitude is also present when the rudders are operated in straight and level flight in response to oscillations of the craft about the direction of flight sensed by a rate of turn gyroscope which operation increases directional stability. These oscillations are inherent in the structure of the craft. The present invention is provided to automatically correct for the apparent aerodynamic differences of the two portions of the rudder which differences causes the gain in altitude in a banked turn and straight and level flight.

The primary object therefore of this invention is to prevent such an altitude gain and to this end it is proposed to sense the rate of turn of a flying wing aircraft in response to elevon and rudder operation and to operate in accordance with the rate of turn the elevon control surfaces downwardly to prevent gain in altitude by said craft during a banked turn.

It is an object of this invention to automatically apply a control effect to an elevon surface of a flying wing aircraft during heading turns of said craft to prevent gain in altitude thereof.

It is a further object of this invention to introduce a control effect on a control surface for changing the pitch attitude of an aircraft downwardly during displacement of a rudder of said craft.

It is a further object of this invention to provide a flying wing aircraft having elevon and rudder control surfaces arranged in the wings with a device for sensing rate of changes in heading resulting from rudder operation and a device for sensing bank angles due to opposite rotation of said elevons and for controlling rotation of both said elevons in the same direction in accordance with the differential effect of both of said devices.

It is a further object of this invention to operate the rudder and elevon control surfaces arranged in the wings of a flying wing aircraft initially to cause a banked turn of said craft and to cause further operation of said elevons in the same direction in response to the difference of the rate of turn of said craft and the bank angle of said craft.

It is a further object of the invention to introduce a control effect due to banking of an aircraft and a control effect due to rate of heading changes of said craft, said effects being of opposite sense and operating a control surface tending to change pitch attitude of said craft from both said control effects.

The above and further objects of the invention will be apparent upon consideration of the following detailed description and drawing disclosing a preferred embodiment thereof.

In the drawings: Figure 1 in general is a functional arrangemnt of the invention, and Figures 2a and 2b together constitute a schematic arrangement of the novel steering mechanism for a flying wing aircraft.

This invention is an improvement in the automatic pilot disclosed in the aforesaid application of Robert J. Kutzler, Serial No. 212,345, filed February 27, 1951. Referring to Figure 1 herein, the present arrangement like the prior arrangement of Robert J. Kutzler referred to includes a right elevon servomotor 11 and a left elevon servomotor 12 for operating the elevons (not shown) but which are positioned in the trailing edge of the all wing aircraft, one elevon being arranged in the left wing and the other being arranged in the right wing. The servomotors 11 and 12 may be controlled to operate both elevons together in the same directions or may be controlled to operate them in opposite directions. When operated in the same direction, the elevons effect a turning moment about the pitch axis of the aircraft but when operated in opposite directions effect a turning moment about the roll axis of the aircraft. The right elevon servomotor 11 is reversibly controlled through an engage relay 13 (Figure 2a) by an amplifier 14. The amplifier 14 is of the A. C. discriminator type being supplied with an alternating current signal voltage and being also connected to an alternating current power source. The direction of rotation of the servomotor 11 depends upon the phase relationship of the alternating current control signal to the alternating current power source. When the two voltages are in phase the motor 11 rotates in one direction and when the voltages are 180° out of phase the motor rotates in the opposite direction. The amplifier may be such as disclosed in Patent 2,425,733 to Willis H. Gille et al. dated August 19, 1947. While the servomotor 11 may be of the type having a continuously running motor selectively coupled by clutches to opposing sun gears of a mechanical differential whose planetary arm is connected to a control surface, such as disclosed in the aforesaid patent to Willis H. Gille et al., it is preferably of the type which is used to actuate the rudder mechanism to be described in this invention.

The left elevon servomotor 12 is reversibly controlled through an engage relay 15 by a left elevon amplifier 16. The amplifier 16 and the servomotor 12 correspond respectively to amplifier 14 and servomotor 11 for the right elevon. The control of the right elevon servomotor 11 by its amplifier 14 is the reverse of that of the left elevon servomotor 12 by its amplifier 16 so that when unlike control signals are applied to the amplifiers 14 and 16 the servomotors 11 and 12 rotate in the same direction to move their elevon control surfaces in the same direction whereas when control signals of opposite polarity are applied to the amplifiers 14 and 16 their servomotors 11 and 12 are operated in reverse directions to move the elevon control surfaces in opposite directions.

Signals of opposite polarity for the two amplifiers are obtained from an elevator function network 20 whereas signals of the same polarity are obtained from an aileron function network 120.

The elevator function network 20 includes sources of control signals and comprises a composite craft pitch attitude signal generator 21 and a craft bank attitude up-elevator signal generator 28; a craft yaw rate down-elevon signal generator 43; a pitch trim signal generator 57; and a craft pitch rate signal generator 62.

The aileron function network 120 includes sources of control signals and comprises a roll trim signal generator 121, a composite craft heading generator 125 and roll attitude generator 132, a heading reset generator 148, and a turn control generator 157.

The control signals on the amplifiers 14, 16 are balanced by signals from servomotor operated balancing signal generators 84 and 106 respectively.

The two rudders (one of which is shown) are sequentially operated by rudder servomotors 195, 200. These motors are alternatively controlled by an amplifier 226 of the A. C. discriminator type. Control signals for amplifier 226 are obtained from a rudder network 240. Network 240 comprises a craft yaw rate generator 241, trim generator 249, craft heading generator 262, yaw reset generator 277, servomotor operated composite rebalance generator 288 and a portion of aileron function network 120 consisting of generators 132, 148, 157.

Figure 2B:
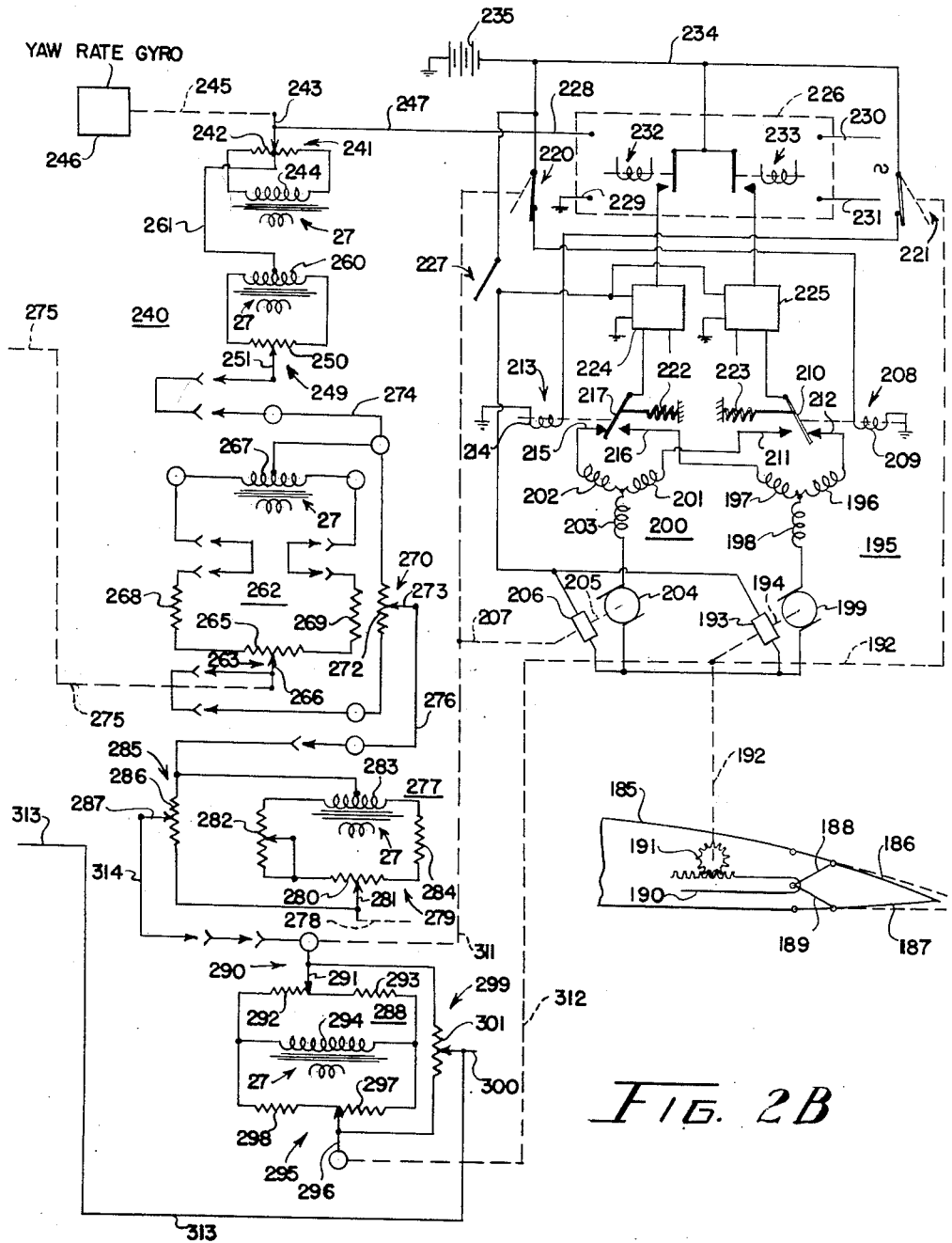

Reverting to pitch function network 20, for the following detailed description of the invention to be considered with Figures 2a and 2b, pitch attitude signal generator 21 consists of a potentiometer having a resistor 23 and a slider 24 adjustable from the midpoint of said resistor in either direction. Resistor 23 is connected across the ends of a secondary winding 25 of a transformer 27 having a primary winding 26. The craft bank attitude up-elevator signal generator 28 comprises a potentiometer 29 having a resistor 30 and a slider 31. One end of resistor 30 is connected in series with additional resistors 32 and 33 to one end of secondary winding 25 of transformer 27, and the opposite end of resistor 30 is connected to the remaining end of secondary winding 25. Signal generator 29 also comprises an up-elevator coordination potentiometer 28 having a resistor 35 and a slider 36. One end of resistor 35 is connected to the junction of resistors 30 and 32 and the opposite end of resistor 35 is connected to the adjustable slider 31. The same primary winding through a plurality of secondaries may be the energy source also for the additional generators to be described.

A conductor 37 extends from slider 24 of the pitch attitude signal generator 21 to a terminal 38. Slider 24 is adjusted along resistor 23 by a suitable operating connection 40 extending from a vertical gyroscope 39. The vertical gyroscope is of the type well known in the art having a rotor with three degrees of angular freedom. The spin axis of the rotor is vertical and the casing supporting the rotor in vertical position is cross-trunnioned in a gimbal ring support to provide rotation of the casing about two respectively horizontal axes. The vertical gyroscope 39 is so arranged in the aircraft that upon movement of the aircraft about the pitch axis slider 24 is moved relative to resistor 23.

Slider 31 is adjusted along resistor 30 by a suitable operating connection 41 extending from the vertical gyroscope 39. The operating connection 41 is adjusted whenever the craft moves about its roll or bank axis. The arrangement is such that with the craft in level position, rotation of the craft in either direction about its roll axis will cause the operating connection 41 to move slider 31 only to the right along resistor 30 so that the phase of the signal is the same irrespective of the direction of roll.

Yaw rate down-elevon signal generator 43 positioned at lower right Figure 2a comprises a potentiometer 44 having a resistor 45 and a slider 46; a secondary winding 47 of transformer 27; and a voltage dividing potentiometer 50 comprising a resistor 51 and a slider 52. The two ends of resistor 45 are connected to a common end of secondary winding 47. A center tap of resistor 45 is connected by conductor 49 to the opposite end of secondary winding 47. One end of resistor 51 is connected to slider 46, and the opposite end of resistor 51 is connected to the end of secondary winding 47 which is connected to the center tap of resistor 45 by conductor 49.

A conductor 55 extends from the center tap conductor 49 to slider 36. Slider 46 is positioned along resistor 45 by means of a suitable operating connection 54 from a yaw rate gyroscope 53. Gyroscope 53 is of the type whose rotor has two degrees of angular freedom with angular movement about one axis restrained. The rotor rotates about a horizontal spin axis in a gimbal ring which is trunnioned about a horizontal axis at right angles to the rotor spin axis with means for restraining precession of the gimbal ring about said last named axis. The arrangement is such that as the craft rotates about its vertical axis the slider 46 is positioned relative to the center tap of resistor 45 in one or another direction depending upon the direction of turn and the extent of such displacement depends upon the rate of turn. It will be evident, however, due to the specific connections of resistor 45 to secondary 47 that the phase of the signal obtained from signal generator 43 is the same irrespective of the direction of turn.

Trim signal generator 57 consists of a potentiometer having a resistor 58 and a slider 59, and resistor 58 is connected across a secondary winding 60 of transformer 27. Slider 59 may be manually adjusted along resistor 58. A conductor 56 extends from slider 59 to the manually adjustable slider 52 of voltage divider 50.

Pitch rate signal generator 62 comprises a potentiometer 63 having a resistor 64 and a slider 65; a pitch rate coordination potentiometer 67 having a resistor 68 and a slider 69; and a secondary 66 of transformer 27. Resistor 64 is connected across the ends of secondary winding 66. Resistor 68 is connected across a center tap of secondary winding 66 and slider 65.

A conductor 80' extends from the center tap of secondary winding 66 to a center tap of secondary winding 60 of the trim signal generator 57. Slider 65 is positioned along resistor 64 through an operating connection 82 from a pitch rate gyroscope 81. The pitch rate gyroscope is similar to yaw rate gyroscope 53 but is mounted differently in said craft and has a rotor freely rotatable in a gimbal ring about one axis and the gimbal ring in turn being trunnioned on an axis at right angles to the rotor spin axis in a support. Precession of the rotor about the trunnion axis may be restrained by spring means, conventionally used. The rate gyroscope 81 is so arranged in the aircraft that the slider 65 is moved with respect to resistor 64 in proportion to the rate of pitch of the aircraft and in a direction depending on the change in pitch attitude. The slider 69 may be manually positioned or adjusted along resistor 68 to select a desired ratio of the rate signal from generator 63 but once adjusted is generally so retained.

It is evident that the aforementioned signal generators are connected in electrical series relation so that the signals provided by the generators may be algebraically added and a resultant signal provided. This resultant signal appears between slider 69 of pitch rate signal generator 62 and terminal 38 connected to slider 24 by conductor 37. An elevator ratio voltage divider 71 is connected between slider 69 and terminal 38. This voltage divider 71 comprises a fixed resistor 72 and an adjustable resistor 73 having a resistor 75 and a slider 74. The two resistors 75 and 72 are connected in series with the remaining end of resistor 72 connected to terminal 38 and the remaining end of resistor 75 being connected to slider 69. Slider 74 is manually adjusted along resistor 75 so that the voltage actually derived from the network 20 for providing an elevator action is obtained between adjustable slider 74 and terminal 38. Conductor 70 connects slider 74 to a terminal 79.

A voltage divider 76 consisting of fixed resistors 77 and 78 is connected between the signal generator output terminals 38 and 79 of network 20. Resistors 77 and 78 are connected in series and are of equal value. Their junction 80 for the moment may be considered at ground potential. It is evident that the difference of potential between terminal 38 and terminal 80 is opposite that between terminal 79 and terminal 80. The difference of potential between terminal 38 and terminal 80 is used to control the operation of the right elevon servo amplifier 14 whereas the potential between terminal 79 and terminal 80 is used to control the operation of the left elevon servo amplifier 16. Although the voltage between terminals 38—80 is opposite to that between terminals 79—80, servomotors 11, 12 rotate in the same direction on unbalance of network 20 by cross connecting one motor to its control amplifier with the other motor directly connected.

The right servomotor amplifier 14 is provided with signal input terminals 85, 86 and power input terminals 87, 88. Terminal 86 is connected to ground which for the present purpose may be considered as at the same potential as terminal 80. Between terminal 38 and the other amplifier input terminal 85 is a right elevon follow-up signal generator 84.

Signal generator 84 comprises a right elevon follow-up potentiometer 90 having a resistor 91 and a slider 92; a right elevon ratio potentiometer 93 having a resistor 94 and a slider 95; a secondary winding 96 of transformer 27, and a fixed resistor 97. Resistor 91 is connected across the ends of secondary winding 96. Resistors 94 and 97 are connected in series and the remaining end of resistor 94 is connected to slider 92 and the remaining end of resistor 97 is connected to terminal 38. A conductor 100 extends from terminal 38 to a center tap of secondary winding 96. A conductor 101 extends from amplifier terminal 85 to slider 95. Slider 92 is positioned along resistor 91 by a suitable operating or follow-up connection 98 from right elevon servomotor 11. Slider 95 is adjusted along 94 by means to be described.

The potential between terminal 80 and terminal 79 is used to control the left elevon servo amplifier 16. The amplifier 16 is provided with signal input terminals 102, 103, and power input terminals 104, 105. Terminal 103 is connected to ground. Between terminal 102 and terminal 79 is a left elevon servomotor follow-up signal generator 106. Signal generator 106 comprises a left elevon servomotor follow-up potentiometer 107 having a resistor 108 and a slider 109, a left elevon ratio potentiometer 110 comprising a resistor 111 and a slider 112, a fixed resistor 113, and a secondary winding 117 of transformer 27. Resistor 108 is connected across the ends of secondary winding 117. Resistors 111 and 113 are connected in series and the remaining end of resistor 111 is connected to slider 109 and the remaining end of resistor 113 is connected to a center tap of secondary winding 117 by conductor 114. A conductor 115 extends from terminal 79 to the center tap of secondary winding 117. A conductor extends from slider 112 to input terminal 102 of amplifier 16. Slider 109 is positioned along resistor 108 in accordance with the movement of servomotor 12 by a suitable operating connection 116. Sliders 112 and 95 may be manually adjusted along their respective resistors 111 and 94 concomitantly by operating means 119.

The aileron action network 120, as stated, comprises an aileron trim signal generator 121; a composite heading responsive bank-craft roll attitude signal generator 131; a heading reset signal generator 148; and a manually operable turn control signal generator 157. Signal generator 121 includes a potentiometer having a resistor 122, a slider 123 and a secondary winding 124 of transformer 27. Resistor 122 is connected across the ends of secondary winding 124 and the slider 123 is positioned along resistor manually. Generator 131 includes a heading control potentiometer 125 comprising a resistor 126 and a slider 127; an adjustable resistor 135; a voltage dividing potentiometer 136; a secondary winding 130 of the transformer 27; a craft roll attitude potentiometer 132 having a resistor 133 and a slider 134; and a turn control coordination potentiometer 143 having a resistor 144 and a slider 145. Resistor 126 is connected across the secondary winding 130. Variable resistor 135 and voltage dividing resistor 137 are connected in series and the remaining end of resistor 135 is connected to slider 127 and the remaining end of resistor 137 is connected to a center tap of secondary winding 130. A conductor 140 extends from slider 123 to manually adjustable slider 138. Slider 127 is positioned along resistor 126 through an operating connection 141 from a heading responsive device 142.

This heading responsive device may be a conventional directional gyroscope of the type well known in the art having its rotor supported in a casing for rotation about a horizontal spin axis with the casing in turn carried in a gimbal ring about a horizontal axis at right angles to the rotor spin axis. The gimbal ring in turn is rotatably carried about a vertical axis. The arrangement is such that upon change in heading of the craft, slider 127 is moved relative to resistor 126. The gyroscope 142 is provided with a caging or locking means for preventing movement of slider 127 by said gyroscope during manually initiated changes in heading.

The resistor 133 of roll attitude potentiometer 132 is connected across the secondary winding 130. Resistor 144 has one end connected to slider 134 of potentiometer 132 and its opposite end connected to a center tap of secondary winding 130. The slider 134 is posiitoned along resistor 133 by means of a suitable operating connection 146, 41 from the vertical gyroscope 39 in accordance with the bank attitude of the aircraft. Slider 134 is displaced from the center point of resistor 133 in one or another direction depending upon the direction of bank of the craft.

Reset signal generator 148 has a resistor 149 with one end connected directly to a secondary winding 152 and its opposite end connected to one end of a variable resistor 151 whose opposite end is connected to the remaining end of secondary winding 152. A ratio potentiometer has a resistor 154 connected across a center tap of secondary winding 152 and slider 150. A conductor 156 extends from the center tap of secondary winding 152 to slider 134. Slider 150 is positioned along resistor 149 by a reset motor more fully disclosed in the aforesaid Kutzler application to cause the craft to hold heading despite any continuous disturbing force tending to change heading.

Manual turn signal generator 157 comprises a pilot's turn control potentiometer 158 having a resistor 159 and a slider 160; a co-pilot or remote turn control potentiometer 162 having a resistor 163 and a slider 164; a secondary winding 161 of transformer 27; a secondary winding 168 of transformer 27; and a fader potentiometer 165 having a resistor 166 and a slider 167. Resistor 159 is connected across the secondary winding 161. Resistor 163 is connected across the secondary winding 168. Resistor 166 of the fader potentiometer is connected across the sliders 160 and 164. A conductor 178 extends from slider 167 of the fader potentiometer to adjustable slider 155. Sliders 160 and 164 may be manually adjusted along their respective resistors 159, 163. A conductor 171 extends from a center tap of secondary winding 161 to ground terminal 177. A conductor 179 extends from a center tap of fader potentiometer resistor 166 to the center tap of secondary 161. A conductor 180 extends from the center tap of resistor 163 to ground terminal 177. It is evident that the left portion of the fader potentiometer serves as a voltage divider for the pilot's turn control potentiometer 158 whereas the portion to the right of the center tap of the fader potentiometer resistor 166 serves as a voltage divider for the co-pilot turn control potentiometer 162.

An aileron ratio potentiometer or voltage divider is provided for network 120. This voltage divider 172 comprises a voltage dividing potentiometer 173 having a resistor 174 and a slider 175 and a fixed resistor 176. Resistors 174 and 176 are connected in series and the remaining end of resistor 174 is connected to a center tap of secondary winding 124 of the trim signal generator 121 and the opposite end of resistor 176 is connected to ground terminal 177. A conductor 182 extends from slider 175 to terminal 80 of network 20.

Passing to Figure 2b, there is shown an arrangement for operating the two rudder control surfaces for the aircraft with a portion 185 of one wing of the aircraft shown in section. This view of the wing shows the two oppositely rotatable portions 186, 187 of the rudder in full line in normally closed position. The dotted lines indicate the respective position of the portions of the rudder when moved toward operated position. The pivot portions 186, 187 may be operated by their respective links 188, 189 connected to a longitudinally movable rack bar 190. The bar may be driven by its engaging pinion 191 carried by an output shaft 192 of one of the rudder servomotors. While but one rudder is illustrated, the other is of the same configuration. The output shaft 192 is connected by a suitable magnetic clutch 193 to a drive shaft 194 of a rudder servomotor 195.

The motor 195 is of the D. C. type having field windings 196, 197, a pulsing clutch 198 and an armature 199. The field windings, pulsing clutch winding 198 and armature are so interconnected that with either field winding energized the pulsing clutch and armature are also energized. The pulsing clutch 198 is the type which when unenergized holds the drive shaft 194 in braked condition but when energized serves to couple the armature 199 to the drive shaft 194. Such type of arrangement is old in the art as evident in Lear 2,267,114. The other rudder motor 200 similarly includes field windings 201, 202, pulsing clutch winding 203, armature 204, drive shaft 205, magnetic clutch 206, and output shaft 207.

Rudder motors 195, 200 are operated in sequence. This sequential operation is controlled by relays 208, 213 of the single-pole, double throw type. Relay 208 includes an operating coil 209, an arm 210, an in contact 212 and an out contact 211. Relay 213 includes an operating winding 214, an arm 217, an in contact 215, and an out contact 216. Winding 196 of motor 195 is connected to in contact 212. Winding 197 is connected to out contact 216 of relay 213. Winding 201 of motor 200 is connected to out contact 211 of relay 208 and winding 202 of motor 200 is connected to in contact 215 of relay 213.

The energization of operating coil 209 of relay 208 is controlled by a limit switch 220 operated from the output shaft 207 of motor 200. The energization of operating coil 214 of relay 213 is controlled by a limit switch 221 operated from the output shaft 192 of motor 195.

Since, as shown in the section of the wing, the rudders may be moved from a closed position toward an open position the switches 220 and 221 are so operated by the output shafts 207, 192 to be normally in the closed (full line) position with its rudder closed. As a motor operates its rudder toward an open position, the switch 220 or 221 operated by its output shaft or spring biased moves to open (dotted) position. Thus the relay arms 210, 217 are shown in their operated position and biasing means 222, 223 are illustrated for moving the relay arms 210, 217 to their unoperated or out position when the respective circuits are opened to operating coils 208, 213.

With relay arm 217 connected to a source of direct voltage, its engagement with in contact 215 calls for rotation of motor 200 to open its rudder whereas engagement of arm 217 with out contact 216 calls for operation of motor 195 to close its rudder. With relay arm 210 connected to a direct voltage source, its engagement with in contact 212 calls for operation of motor 195 to open its rudder whereas engagement of arm 210 with contact 211 calls for operation of 200 to close its rudder. Arms 217, 210 are connected to a source of direct voltage through the output of an amplifier 226 through their respective rudder engage relays 224, 225. The energization of relays 224, 225 is controlled from a manually operable single pole single throw switch 227 which concomitantly energizes the magnetic clutches 193, 206. The single pole single throw switch 27 may be arranged to concomitantly energize elevon engage relays 13, 15, Figure 2a, and corresponding magnetic clutches for motors 11, 12.

Returning, amplifier 226 is of the A. C. discriminator type. The amplifier 226 includes A. C. signal input connections 228, 229 and A. C. power input connections 230, 231. The amplifier 226 includes relays 232, 233 which are alternatively operated depending upon the phase relationship of the A. C. signal input voltage with respect to the power input voltage. For simplicity, relays 232, 233 are indicated as having a single arm and single in contact. Engage relay 224 is connected to the in contact of amplifier relay 232 and engage relay 225 is connected to the in contact of amplifier relay 233. The relay arms are connected to a D. C. busbar 234 supplied with power from a battery 235 or other suitable source.

With both rudders in the closed position so that both relays 208, 213 are operated, the closing of amplifier relay 232 will transmit D. C. voltage to winding 202 of motor 200 causing it to rotate its rudder toward open position. This rotation immediately opens switch 220 causing the deenergization of relay winding 209 and movement of arm 210 against out contact 211. If thereafter the other amplifier relay 233 is energized, winding 201 of motor 200 is energized to move its rudder toward closed position. At the instant of closing of its rudder, switch 220 is closed and relay 208 becomes operative. Further continued energization of amplifier relay 233 results in energization of winding 196 of rudder motor 195 thereby causing the other rudder to be moved to open position opening also switch 221. Subsequent energization of amplifier relay of 232 causes the energization of winding 197 of motor 195 whereby the operated rudder is moved toward closed position. It is thus evident that sequential operation of the two rudders is obtained.

Reverting to amplifier 226, the control signal applied to terminals 228, 229 is derived from a balanceable control network 240. Network 240 includes in review a yaw rate signal generator 241, a rudder trim signal generator 249, a heading control signal generator 262, a yaw reset signal generator 277, a servomotor follow-up signal generator 288, and in the aileron network 120 the turn control coordination potentiometer 143, the voltage dividing potentiometer 153, and the manual turn control network 157.

Signal generator 241 comprises a potentiometer having a resistor 242 connected across a secondary winding 244 of transformer 27 and a slider 243 positioned along resistor 242 by a suitable operating connection 245 from a yaw rate gyroscope 246. The yaw rate gyroscope 246 is of the conventional two degrees of angular freedom type of gyroscope with restraint applied to angular movements about one axis. Slider 243 is moved along resistor 242 from the center point thereof in one or another direction depending upon the direction of the turn and in an amount depending upon the rate of turn. A conductor 247 extends from the input connection 228 of amplifier 226 to slider 243. Trim signal generator 249 comprises a potentiometer having a resistor 250 and a slider 251 with the resistor connected across a secondary winding 260 of transformer 27. The slider 251 is manually adjusted along resistor 250. A conductor 261 extends from a center tap of resistor 242 in the rate signal generator to a center tap of secondary winding 260.

Heading signal generator 262 includes a heading detecting potentiometer 263 having a resistor 265 and a slider 266; fixed resistors 268, 269, a secondary winding 267 of transformer 27, and a voltage dividing potentiometer 270 having a resistor 272 and a slider 273. One end of resistor 265 is connected in series with resistor 268 to one end of secondary winding 267 and the opposite end of resistor 265 is connected in series with resistor 269 to the other end of secondary winding 267. The resistor 272 of voltage dividing potentiometer 270 is connected across a center tap of secondary winding 267 and slider 266. A conductor 274 extends from slider 251 of signal generator 249 to a center tap of secondary winding 267. Slider 273 is manually positioned or adjusted along resistor 270 and slider 266 is moved along resistor 265 by a suitable operating connection 275, 141 from the heading responsive device 142.

The yaw reset signal generator 277 comprises a yaw reset potentiometer 279 having a resistor 280 and a slider 281, a variable resistor 282, a secondary winding 283 of transformer 27, a fixed resistor 284, and a voltage dividing potentiometer 285 having a resistor 286 and a slider 287. One end of resistor 280 is connected in series with the variable resistor 282 to one end of secondary winding 283 and the opposite end of resistor 280 is connected in series with resistor 284 to the remaining end of secondary winding 283. Resistor 286 of the voltage divider potentiometer is connected across the slider 281 and a center tap of secondary winding 283. A conductor 276 extends from the center tap of the secondary winding 283 to the slider 273 of voltage dividing potentiometer 270. The slider 281 is positioned along resistor 280 by a yaw reset operating device 278 as disclosed more fully in the aforesaid prior application of Robert J. Kutzler.

The follow-up signal generator 288 comprises a follow-up potentiometer 290 having a slider 291 and a resistor 292; a fixed resistor 293, a fixed resistor 298, a follow-up potentiometer 295 having a slider 296 and a resistor 297; a secondary winding 294 of transformer 27; and a voltage dividing potentiometer 299 having a slider 300 and a resistor 301. Resistor 292 has one end connected to one end of secondary winding 294 and its other end connected in series with resistor 293 to the opposite end of secondary winding 294. Resistor 298 has one end connected directly to secondary winding 294 and its opposite end connected in series with resistor 297 to the remaining end of secondary winding 294. Voltage dividing resistor 301 is connected across sliders 291 and 296. A conductor 314 extends from voltage dividing potentiometer slider 287 to slider 291. Slider 291 is moved from its normal position shown toward the left by suitable operating connection 311 extending from the output shaft 207 of servomotor 200. Slider 296 is moved along resistor 297 toward the right from its normal position by a suitable operating connection 312 extending from the output shaft 192 of servomotor 195.

A conductor 313 extends from slider 300 of voltage divider 299 to slider 145 of the turn control coordination potentiometer 143. The remainder of the rudder control network has been previously described in connection with the description of aileron network 120.

Operation

The operation of the elevon servomotors to effect elevator function will be initially considered. Assuming the aircraft to have been airborne and to have attained sufficient altitude when autopilot control may be applied, the manually operable control switch 227 is operated to energize the engage relays 13, 15, 224, 225 and the magnetic clutches 193, 206 and their equivalents in elevon servos 11, 12, thereby associating the respective control surfaces with their servomotors and maintaining such surfaces held in locked position during the time the servomotor of each surface is unenergized, and associating the amplifiers with the servomotors.

In the aileron network 120, with sliders 123, 127, 134, 150, 160, and 164 at the centers of their respective resistors, there is no control signal generated in network 120, consequently terminal 80 and terminal 177 are both at ground potential. In elevator function network 20, with sliders 24, 31, 59, 65, at the centers of their respective resistors there is no signal generated in network 20. Also with slider 92 in generator 84 and slider 109 in signal generator 106 at their normal positions, there is no signal generated in networks 84 or 106.

If the craft moves about its pitch axis, slider 24 will be moved along resistor 23 to generate a signal depending upon the direction and magnitude of change of pitch. This signal is applied across the fixed voltage divider 76 so that a potential between terminal 38 and 80 (ground potential) is applied to right elevon servo amplifier 14 and a signal equal to but of opposite phase between terminals 79 and 80 is applied to left elevon servo amplifier 16. The amplifiers 14 and 16 effect operation of their respective servomotors 11 and 12 since servomotors 11 and 12 are designed to operate in the same direction upon opposite signals being applied to their amplifiers 14 and 16. The effect of this is that the right and left elevons are moved in the same direction. The right servomotor through its operating connection 98 displaces slider 92 until the difference of potential between voltage divider slider 95 and the center tap of secondary winding 96 or terminal 38 reaches such a magnitude as to be equal but opposed to the potential difference between terminal 38 and terminal 80 when the right servomotor thereupon ceases further rotation. A similar effect is applied in the left elevon servo circuit which is manifested by the positioning of slider 109 from the follow-up connection 116 of the left elevon servo 12.

In order to obtain operation of the elevons to effect the aileron function, we may assume networks 20, 84, and 106 in their original normal condition and aileron function network 120 at present in normal condition. If the slider 123 is manually positioned along resistor 122 to derive a voltage between it and the center tap of secondary winding 124 this voltage is applied across the voltage divider 76. The voltage between slider 175 and ground terminal 177 is thereupon applied to terminal 80. This voltage between terminal 80 and terminal 177 is applied equally to both right and left elevon servo amplifiers 14 and 16 resulting in the operation of the left elevon servomotor 11 and the right elevon servomotor 12 so that their elevons are positioned in opposite directions. The servomotors operate through their follow-back connections 98 and 116, the rebalancing signal generators 84, 106 to limit the amount of rotation of the servomotors and therefore the elevons proportional to the displacement of slider 123. In response to the bank of the craft due to aileron action, the vertical gyroscope adjusts its roll attitude slider 134 causing reverse unbalance of network 120 whereby the elevons are returned toward unoperated position to limit the bank to the magnitude of manual signal. The vertical gyroscope also adjusts slider 36 of the up-elevon potentiometer to unbalance network 20 and cause a slight upward displacement of both elevons.

The rudder operation is a proportional operation like that of the elevons. Thus with the circuit 240 for controlling the rudder amplifier 226 in balanced condition, operation of the manually positioned trim knob 251, for example, will cause an unbalance of the network 240. This results in the amplifier 226 operating, through its relays 232 or 233, servomotors 195 or 200. The operation of either motor results in a follow-up movement of slider 291 or 296 to balance and limit the amount of movement of the servomotor in accordance with the movement of the slider 251. Similarly the heading responsive device 142 controls the motor in proportion to heading changes.

The operation of the elevons and rudder control surfaces may be effected simultaneously from the manually operable turn control network 157 or heading responsive device 142. With the slider 167 of the fader potentiometer 165 toward the left from the mid-position and considering a manually controlled turn, operation of slider 160 of the pilot's potentiometer 158 causes a signal potential to be derived between slider 160 and ground terminal 177. This signal voltage is applied through the heading reset signal generator 148 and turn coordination potentiometer 143 and conductor 313 and the portion of network 240 shown in Figure 2b to the rudder amplifier 226 to effect rotation of one or the other of the servomotors. The follow-up action of the rudder servomotor develops a potential between slider 300 and the unoperated follow-up slider which is equal and opposite to the signal from the pilot's potentiometer 158.

The signal from the pilot's potentiometer 158 also appears across voltage divider 76 and is applied at terminal 80. The voltage between terminal 80 and ground terminal 177 is thus applied to both elevon amplifiers 14 and 16 causing the rotation of the right and left elevons in opposite directions.

The operation of the pilot's slider 160 is accompanied by the rendering of the operation of the slider 127 and 266 ineffective by the heading deviation means 142 in a manner similar to that shown in a prior application of Robert J. Kutzler, Serial No. 14,787, filed March 13, 1948. Since the presence of the arrangement for preventing operation of sliders 127, 266 is not necessary to an understanding of the present invention, it has been omitted for the purpose of clarity.

The operation of the pilot's potentiometer slider 160, as stated, in effecting elevon and rudder operation, will cause the aircraft to go into a banked turn or if the heading responsive means 142 senses a change in the heading of the craft, the signal will be placed in a banked turn, as previously explained, to restore the heading of the craft to the desired one. The vertical gyroscope 39 by operating slider 134 supplies signals to network 120 and 240 so that the elevon and rudder are moved to unoperated position. It has been found desirable in such turn to provide generally an up-elevator signal in proportion to the magnitude of bank of the aircraft to prevent loss of altitude in such turn. This signal comes from the up-elevator signal generator 29.

During the entry into the turn, however, as distinguished from the steady state portion of the turn, the craft has a tendency to increase in altitude rather than merely maintain its altitude from the up-elevator signal generator.

It will be noted that in the construction of the rudder, see Figure 2b, the two hinged portions, 186, 187 apparently are displaced equal angular amounts from their respective closed positions during operation of a rudder servomotor to effect merely an increased drag on its wing. It appears, however, that the upper portion of the rudder surface has a greater effect than the lower portion of the operated rudder. Thus the upper portion 186 tends to rotate the craft about its pitch axis in an upward attitude from trailing edge to leading edge so as to tend to cause the craft to climb.

In order to offset this tendency to change attitude during operation of a rudder, the signal generator 43 previously described has been provided in the pitch function network 20 to effect a compensating operation of the elevon control surfaces of the aircraft. Thus when either one or the other of the aircraft rudder control surfaces is operated to cause a turn of the craft about its vertical axis the yaw rate gyroscope 53 responds to the rate of turn set up and provides a signal from the signal generator 43 so that the elevons are moved in a downward direction to compensate for the tendency of the upper portion of the operated rudder surface tending to cause a change in attitude.

With the present arrangement, as the aircraft enters a turn at which time its rate of turn caused by the rudder is greater than the corresponding bank angle required for coordination, the yaw rate gyroscope signal generator 43 provides a down elevon signal in excess of the up-elevator signal from generator 29 to prevent gain in altitude during entry. After the aircraft is in the steady state portion of the turn which is now coordinated and with the rudder returned to normal position, the rate of turn is proportional to the bank angle. The up-elevator signal during the steady state portion of the turn which is obtained from signal generator 29 in network 20 is greater than the down elevon signal from signal generator 43 so that the net elevator position of the elevons is in an upward direction tending to maintain altitude during the turn. Thus, it is evident that while the initial yaw rate is such as to permit a down elevon signal during turn entry yet during the steady state or coordinated portion of the turn, a net up-elevon position is obtained to prevent loss of altitude.

It will now be apparent that there has been provided novel apparatus for compensating for the difference in aero-dynamic effects of the two portions of a rudder which has a net result of providing a moment about the turn and pitch axes of the aircraft by opposing the turning moment about the pitch axis by a counter moment derived from positioning of the elevon control surfaces having a moment about the pitch axis, so that the aircraft tends to maintain altitude during entry into and during the steady state portion of a bank turn.

What is claimed is:

1. Control apparatus for an aircraft having elevon control surfaces operable together in the same or alternatively in opposite directions to exert moments about the pitch or roll axis of the craft and having a pair of rudders sequentially operable, each rudder having two portions which are arranged to swing outwardly transversely from the wing surface of said aircraft in opposite directions, from the trailing edge of the wing of said craft an operated rudder exerting a moment about the vertical axis and a moment about the pitch axis, said apparatus comprising: motor means for operating said elevons; motor means for operating said rudders; heading control means having connections for operating said elevon motor means and said rudder motor means to oppositely move said elevons and position a rudder to place said craft in a banked turn; means responsive to rate of turn of said craft about its vertical axis; means responsive to bank of said craft; and means for further operating both said elevons in the same direction and controlled from said rate of turn and said bank responsive means.

2. The apparatus of claim 1, with follow-up means operated by said elevon motor means and said rudder motor means for limiting operation thereof proportional to operation of said heading control means.

3. Control apparatus for an aircraft having elevons operable in the same or alternatively in opposite directions to exert moments either about the pitch or roll axis of the craft respectively and a rudder consisting of two portions hinged to swing outwardly from the trailing edge of the wing of said craft to exert moments about the vertical and pitch axis of the craft, said apparatus comprising: selective means for producing a signal corresponding with a desired rate of turn of said craft; operating elevon motor means; rudder operating motor means; control means for said elevon motor means; control means for said rudder motor means; connecting means for applying said signal to both control means to position said elevons in opposite directions and position said rudder to initiate a banked turn of said craft; signal providing means responsive to rate of turn of said craft about its vertical axis; further signal providing means responsive to bank of said craft; and connecting means for additionally operating said elevon control means from said rate of turn and bank responsive signal providing means for causing additional movement of said elevons in the same direction to oppose the moment of the rudder surface about the pitch axis.

4. Control apparatus for an aircraft having elevons operable in the same direction for exerting moments about the pitch axis or operable in opposite directions to exert moments about the roll axis and a rudder consisting of portions swingable outwardly from the trailing edge of a wing of said craft for exerting moments about the vertical and pitch axis, said apparatus comprising: elevon operating motor means; rudder operating motor means; control means for said elevon motor means; control means for said rudder motor means; means for producing a signal proportional to a desired rate of turn of the craft and connected to both control means to cause opposite movement of said elevons and movement of said rudder to cause said craft to undergo a banked turn; and further means responsive to rate of rotation of said craft about its vertical axis for producing a second signal and connected to said elevon control means to cause said elevons to move downwardly to prevent gain in altitude by said craft due to the moment of the rudder about the pitch axis.

5. Control apparatus for an aircraft having two pairs of control surfaces arranged in the trailing edge of the wings of said craft, said apparatus comprising: means for projecting one control surface of one of said pairs from the plane of the wing about an axis so as to receive on said surface an impact of the airstream and thus cause said craft to turn about its vertical axis; means responsive to the rate of turn of the craft about said axis; control means operated by said rate of turn responsive means; and further means operated by said control means for moving the other pair of control surfaces in a downward direction to exert a moment about the craft pitch axis to prevent gain in altitude by said craft from an upward moment by said one surface due to the impact of the airstream on said one control surface.

6. Control apparatus for an aircraft having a first control surface in one wing that produces a moment about the vertical and pitch axes of said craft and a second and third control surface in each wing that produce when operated in the same direction a moment about the pitch axis and when operated in opposite directions produce a moment about the roll axis, said apparatus comprising means for operating said first, second, and third surfaces from a normal position to place said craft in a banked turn; and further means responsive to rate of turn of said craft for additionally operating said second and third surfaces in the same direction to oppose the moment of said operated first control surface about the pitch axis.

7. Control apparatus for an aircraft having a first control surface arranged in a wing that produces a moment about the craft vertical and pitch axes and a second and third control surface arranged in the wings of said craft and producing a moment about the craft roll axis when said second and third surfaces are positioned in opposite directions and producing a moment about the craft pitch axis when positioned in the same direction, said apparatus comprising: a first control means for operating said first surface; a second control means for operating said second and third surfaces; signal means responsive to change in heading and having connections for operating both control means to place said craft in a banked turn; and further signal means responsive to the movement of the craft about said vertical axis and having connections for further operating said second control means to effect movement of said second and third surfaces to produce a moment opposing the moment of said first surface about the pitch axis.

8. Control apparatus for an aircraft having a first control surface arranged in a wing of said craft that produces on operation a desirable moment about the craft vertical axis and an undesirable moment about the pitch axis and a second and third control surface arranged in the wings of said craft and producing moments about the craft roll axis when said second and third surfaces are positioned in opposite directions and producing moments about the craft pitch axis when positioned in the same direction; said apparatus comprising: a first control means for operating said first surface; a second control means for operating said second and third surfaces; heading change means having connections for operating both control means to effect operation of said three surfaces to place said craft in a banked turn; and further means effective by the craft movement during operation of said first surface for further operating said second control means to effect additional movement of said second and third surfaces to produce moments about the pitch axis opposing the moment about the pitch axis of said first surface.

9. Control apparatus for an aircraft having a first control surface arranged in a wing of said craft that produces on displacement from a normal position a moment about the craft vertical and pitch axes and a second and third control surface arranged in the wings of said craft and producing moments about the craft roll axis when said second and third surfaces are displaced from a normal position in opposite directions and producing a moment about the craft pitch axis when said surfaces are positioned from normal in the same direction; said apparatus comprising: a first control means connected for operating said first surface; a second control means connected for operating said second and third surfaces; means connected for operating both control means to effect operation of said three surfaces to place said craft in a banked turn; means responsive to the bank attitude of the aircraft for operating said second control means to effect operation of said second and third surfaces in an upward direction to maintain the altitude of the craft during said turns; and means for modifying the position of said second and third surfaces from said bank responsive means during entry of said craft into said turn.

10. Control apparatus for a flying wing aircraft having elevon control surfaces operable in the same direction for producing moments about the craft pitch axis and operable in opposite directions for producing moments about the craft roll axis and having a pair of rudders sequentially operable, each rudder having two portions which are arranged to swing outwardly transversely from the wing surface of said aircraft in opposite directions each rudder producing a moment about the craft vertical and pitch axes, said apparatus comprising: a first balanceable control means for operating said elevon surfaces; a second balanceable control means for operating said rudder surfaces; selective means for unbalancing both control means to effect operation of said elevons and one of said rudders to place said craft in a banked turn; further means responsive to the bank attitude of the aircraft for further unbalancing said first control means to effect operation both of said elevon surfaces in an upward direction to maintain the altitude of the craft during said turn; and additional means for unbalancing said first control means for modifying the position of said elevons dictated by said bank responsive means during entry of said craft into said turn.

11. Control apparatus for an aircraft having elevon control surfaces together in the same direction and producing moments of the craft about the pitch axis and operable in opposite directions for producing moments about the craft roll axis, and having a pair of rudder control surfaces sequentially operable each rudder having two portions which are arranged to swing outwardly transversely from the wing surface of said aircraft an operated rudder exerting a moment about the craft vertical axis and a moment about the craft pitch axis, said apparatus comprising: a first control means including two motors for operating said elevon surfaces; a second control means including two motors for operating said rudders; heading change detecting means for operating both control means to effect operation of both elevon motors and one rudder motor to place said aircraft in a banked turn; and means effective during operation of said rudder by its motor and responsive to craft rate of turn for further operating said second control means to effect movement of said elevon surfaces in the same direction to produce moments about the pitch axis of said craft opposing the moment of said rudder surface about said pitch axis.

THEODORE K. FRYSTAK.

No references cited.